United States Patent
Lee et al.

(10) Patent No.: US 9,553,814 B2
(45) Date of Patent: Jan. 24, 2017

(54) METHOD AND APPARATUS FOR CONTROLLING DATA FLOW BY USING PROXY SERVER

(71) Applicant: Samsung Electronics Co., Ltd., Gyeonggi-do (KR)

(72) Inventors: Chul-Ki Lee, Seoul (KR); Sang-Jun Moon, Seoul (KR); Yong-Seok Park, Seoul (KR); Jiangwei Xu, Gyeonggi-do (KR); Jung-Hwan Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 14/368,241

(22) PCT Filed: Dec. 18, 2012

(86) PCT No.: PCT/KR2012/011072
§ 371 (c)(1),
(2) Date: Jun. 23, 2014

(87) PCT Pub. No.: WO2013/094964
PCT Pub. Date: Jun. 27, 2013

(65) Prior Publication Data
US 2015/0006625 A1   Jan. 1, 2015

(30) Foreign Application Priority Data
Dec. 23, 2011  (KR) .................... 10-2011-0141389

(51) Int. Cl.
*G06F 15/16* (2006.01)
*H04L 12/825* (2013.01)
(Continued)

(52) U.S. Cl.
CPC .................. *H04L 47/25* (2013.01); *H04L 1/16* (2013.01); *H04L 47/193* (2013.01); *H04L 47/40* (2013.01); *H04L 67/28* (2013.01); *H04W 28/0273* (2013.01)

(58) Field of Classification Search
None
See application file for complete search history.

(56) References Cited

U.S. PATENT DOCUMENTS

| | | | | |
|---|---|---|---|---|
| 8,379,515 B1 * | 2/2013 | Mukerji | ................ | H04L 47/323 370/229 |
| 2009/0193071 A1 * | 7/2009 | Qiu | ..................... | G06F 11/0709 709/203 |

(Continued)

FOREIGN PATENT DOCUMENTS

| KR | 10-2008-0006373 | 1/2008 |
|---|---|---|
| KR | 10-2010-0038798 | 4/2010 |

(Continued)

OTHER PUBLICATIONS

International Search Report dated Mar. 28, 2013 in connection with International Patent Application No. PCT/KR2012/011072, 5 pages.

(Continued)

*Primary Examiner* — John B Walsh

(57) ABSTRACT

A method for controlling data flow by a proxy server connected between a User Equipment (UE) and a content server is disclosed. The proxy server estimates a first amount of data reception indicating an amount of data received by the UE and calculates a second amount of data reception indicating an amount of data received by the proxy server from the content server. The proxy server delays transmission of acknowledgement (ACK) on data received by the proxy server from the content server and waits until a time allowed for the transmission, if the second amount of data reception is greater than the first amount of data reception by a predetermined threshold. The resent disclosure may pre- (Continued)

vent a waste of network load and unnecessary resources by the proxy server controlling download data rate from the content server.

17 Claims, 4 Drawing Sheets

(51) Int. Cl.
    *H04L 1/16*     (2006.01)
    *H04L 29/08*     (2006.01)
    *H04W 28/02*     (2009.01)
    *H04L 12/893*     (2013.01)
    *H04L 12/801*     (2013.01)

(56) References Cited

U.S. PATENT DOCUMENTS

2011/0153828 A1    6/2011    Park et al.
2012/0129517 A1*    5/2012    Fox .................... H04L 41/5025
                                                      455/425

FOREIGN PATENT DOCUMENTS

KR    10-2010-0088990    8/2010
KR    10-2011-0069691    6/2011

OTHER PUBLICATIONS

Written Opinion of International Searching Authority dated Mar. 28, 2013 in connection with International Patent Application No. PCT/KR2012/011072, 3 pages.

* cited by examiner

METHOD AND APPARATUS FOR CONTROLLING DATA FLOW BY USING PROXY SERVER

CROSS-REFERENCE TO RELATED APPLICATION(S)

The present application claims priority under 35 U.S.C. §365 to International Patent Application No. PCT/KR2012/011072 filed Dec. 18, 2012, entitled "METHOD AND APPARATUS FOR CONTROLLING DATA FLOW BY USING PROXY SERVER". International Patent Application No. PCT/KR2012/011072 claims priority under 35 U.S.C. §365 and/or 35 U.S.C. §119(a) to Korean Patent Application No. 10-2011-0141389 filed Dec. 23, 2011 and which are incorporated herein by reference into the present disclosure as if fully set forth herein.

TECHNICAL FIELD

The present disclosure relates generally to data flow control in a communication system, and more particularly, to a method and apparatus for controlling data flow by a proxy server in the communication system.

BACKGROUND ART

In the communication system, a proxy server acts as a cache that downloads data from a content server and transfer the data to User Equipment (UE) over a radio access network.

For example, the UE accesses a Wireless Access Point (WAP) and downloads data like a video file from the content server on a network. In this regard, the proxy server operates as an intermediary between the content server and the WAP to send data to the UE as soon as the proxy server downloads the data required by the UE from the content server.

The UE may have a Just-In-Time delivery (JIT) function to control download speed of data properly. The JIT function refers to a function to control, for example, a video file like Video On Demand (VOD) to be downloaded not so much as it is played by the user, in order to control transmission bandwidth to a proper level while reducing the amount of data to be unnecessarily downloaded just in case the user stops watching the video halfway. The JIT function is very useful in that a waste of resources may be prevented in case that the user stops playing a video file halfway before the end of the video file.

In the case the proxy server acts as an intermediary between the UE and the content server, sometimes, the proxy server also does not need to download data unnecessarily faster than the UE does. Accordingly, a need exists for a technology for the proxy server to control data to be downloaded at a proper speed by taking into account a download speed of the UE.

DISCLOSURE

Technical Problem

The present disclosure provides a method and apparatus for a proxy server to control data receive rate at which data is received from a content server, based on a data receive rate of user equipment.

The present disclosure also provides a method and apparatus for controlling an amount of data received at a proxy server to be a little more than an amount of data received at user equipment.

The present disclosure also provides a method and apparatus for controlling a data receive rate based on an amount of data received at user equipment when a proxy server is to receive data from a content server.

Technical Solution

In accordance with an aspect of the present disclosure, a method for controlling data flow by a proxy server connected between a User Equipment (UE) and a content server is provided. The method includes estimating a first amount of data reception indicating an amount of data received by the UE from the proxy server; calculating a second amount of data reception indicating an amount of data received by the proxy server from the content server; and delaying transmission of acknowledgement (ACK) on data received by the proxy server from the content server, if the second amount of data reception is greater than the first amount of data reception by a predetermined threshold.

In accordance with another aspect of the present disclosure, an apparatus for controlling data flow in a proxy server connected between a User Equipment (UE) and a content server is provided. The apparatus includes a first transceiver responsible for data transmission and reception with the UE; a second transceiver responsible for data transmission and reception with the content server; and a controller for estimating a first amount of data reception indicating an amount of data received by the UE through the first transceiver; calculating a second amount of data reception indicating an amount of data received from the content server through the second transceiver; and delaying transmission of acknowledgement (ACK) on data received from the content server, if the second amount of data reception is greater than the first amount of data reception by a predetermined threshold.

BEST MODE

Figure 1:
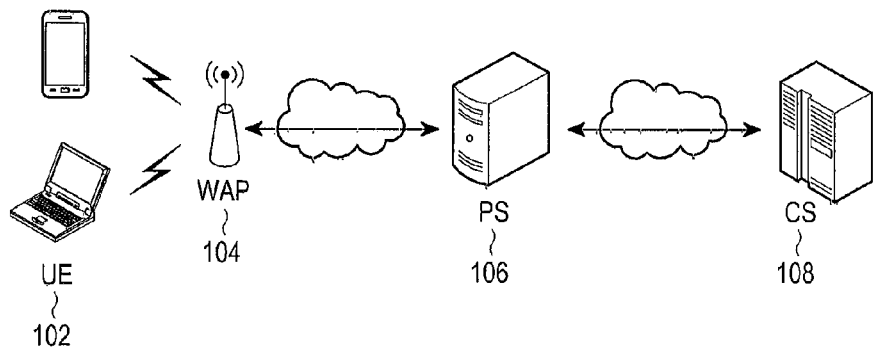
FIG. 1 illustrates a network configuration, according to an embodiment of the present disclosure.

Reference will now be made in detail to embodiments, examples of which are illustrated in the accompanying drawings, wherein like reference numerals refer to the like elements throughout. In the description of the present invention, if it is determined that a detailed description of commonly-used technologies or structures related to the invention may unnecessarily obscure the subject matter of the invention, the detailed description will be omitted. Further, terms, as will be mentioned later, are defined by taking functionalities of the present invention into account, but may vary depending on certain practices or intentions of users or operators. Accordingly, the definition of the terms should be made based on the descriptions throughout this specification.

A proxy server in accordance with embodiments of the present disclosure controls data flow from a content server such that the proxy server downloads a bit more amount of data than a user equipment (UE) does. To do this, the proxy server employs a method to delay transmission of Acknowledgement (ACK) on data downloaded from the content server. Embodiments of the present disclosure may be usefully applied in a case where the UE has a Just-In-Time delivery (JIT) function for execution of Video ON Demand (VOD).

FIG. 1 illustrates a network configuration, according to an embodiment of the present disclosure.

Referring to FIG. 1, UE 102 is a portable device, such as a cell phone, a smartphone, a notebook with a communication module, etc., having a function to access Wireless Access Point (WAP) 104 over a radio access network and download data from a content server 108. A proxy server 106 acts as an intermediary between the content server 108 and the WAP 104, sending data to the UE 102 as soon as downloading data requested by the UE 102 from the content server 108. As an example, the proxy server 106 may be implemented as a standalone entity between the content server 108 and the WAP 104 or may be equipped close to or inside the WAP 104.

Figure 2:
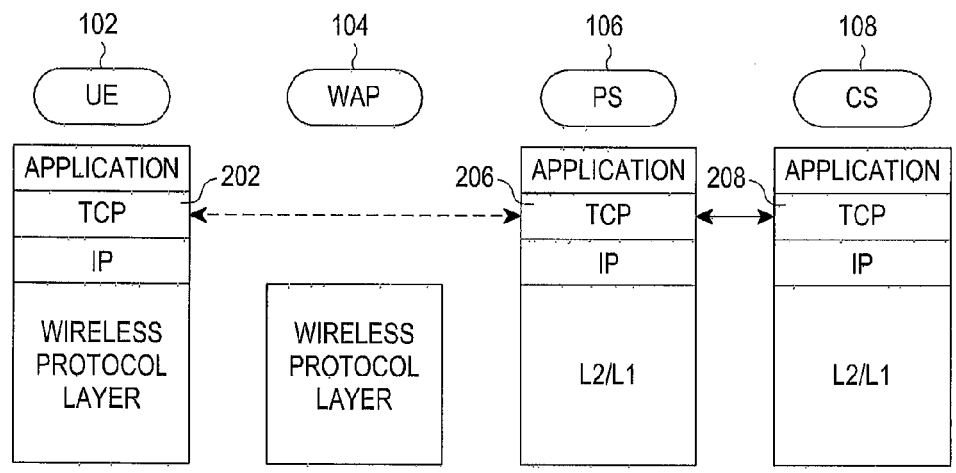
FIG. 2 illustrates relations among network elements and layer structures, according to an embodiment of the present disclosure.

FIG. 2 illustrates relations among network elements and layer structures, according to an embodiment of the present disclosure.

Referring to FIG. 2, the UE 102 includes an application, such as a video player, a Transfer Control Protocol (TCP) layer 202 acting on an Internet Protocol (IP) to control data flow, and a radio protocol layer. The WAP 104 includes a radio protocol layer for connecting the UE 102 to the proxy server 106. The proxy server 106 includes an application, a TCP layer 206 that works with the TCP layer 202 of the UE 102, and a lower L2/L1 layer. The content server 108 includes an application, a TCP layer 208 that works with the TCP layer 206 of the proxy server 106, and a lower L2/L1 layer.

As illustrated, the proxy server 106 receives packets (i.e., TCP segments) into which data (e.g., a video file) wanted by a user is divided, by a TCP connection established between the proxy server 106 and the content server 108, and sends the UE 102 the packets by a TCP connection established with the UE 102. The proxy server 106 may control TCP traffic between the proxy server 106 and the content server 108 by using an amount of data sent to the UE 102 and ACK transmission in the proxy server 106. That is, by delaying transmission of an ACK from the proxy server 106 to the content server 108 based on an amount of data received by the UE 102, the proxy server 106 may more precisely control an amount of data to be received by the proxy server 106.

When a TCP connection is established in the TCP protocol, each side sets a random number to be its first sequence number and increases a sequence number from the initial sequence number by the number of transmitted bytes whenever a packet is transmitted. A receiver sends a transmitter an ACK number that indicates a sequence number of the next data expected to be received. The transmitter may know of an amount of data received by the receiver through the ACK number. The ACK number is sent in a TCP header of a TCP segment, and a TCP segment including the ACK number will be referred herein to as a TCP ACK.

The proxy server 106, upon reception of data from the content server 108, informs the content server 108 of an amount of its received data while receiving data from the content server 108 through a TCP ACK, and sends the UE 102 data received from the content server 108 and receives an amount of data received by the UE 102 from the UE 102 through a TCP ACK.

In a case the proxy server 106 sends a TCP ACK as it receives data, data is received from the content server 108 at a maximum rate the content server 108 may send. On the contrary, if the proxy server 106 sends a TCP ACK slowly to the content server 108, data transmission rate may decrease. This is because the content server 108 may not send as much data as a window size set by the TCP protocol until a TCP ACK is received.

That is, the proxy server 106 may slow down the download speed from the content server 108 by delaying TCP ACK rather than sending it immediately after it receives data. By doing this, the proxy server 106 may prevent data from being unnecessarily downloaded.

The proxy server 106 estimates an amount of data received by the UE 102 based on the ACK number of a TCP ACK received from the UE 102, and sends the content server 108 only a TCP ACK that corresponds to the amount of data received by the UE 102. In practice, the TCP ACK is sent to the content server 108 based on the amount of data received by the UE 102 instead of an amount of data received from the content server 108.

Figure 3:
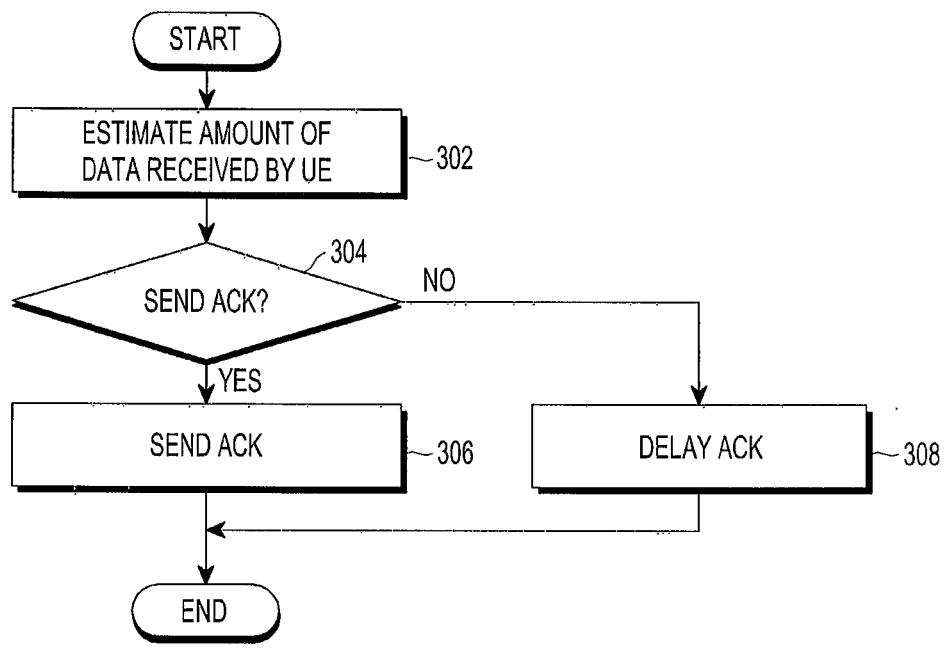
FIG. 3 is a flowchart illustrating operations of a proxy server, according to an embodiment of the present disclosure.

FIG. 3 is a flowchart illustrating operations of a proxy server, according to an embodiment of the present disclosure.

Referring to FIG. 3, in operation 302, a proxy server estimates a size of data that a UE has downloaded through the proxy server, i.e., an amount of received data. The amount of data received by the UE may be estimated using an ACK number included in an ACK sent from the UE. In operation 304, the proxy server determines whether to send or delay an ACK to be sent to a content server. Such determination is made based on the estimated amount of data received and a predetermined threshold.

If it is determined to send the ACK, in operation 306, an ACK on data having been received up to the present from the content server to the proxy server is sent to the content server. On the other hand, if it is determined to delay the ACK, in operation 308, an ACK on data having been actually received up to the present is stored in a queue within the proxy server until transmission of the ACK is permitted. Permission of transmission of the ACK is determined based on an amount of data received by the UE, an amount of data received by the proxy server, and queued time when the ACK is stored in the queue, i.e., delay time of the ACK.

Figure 4:
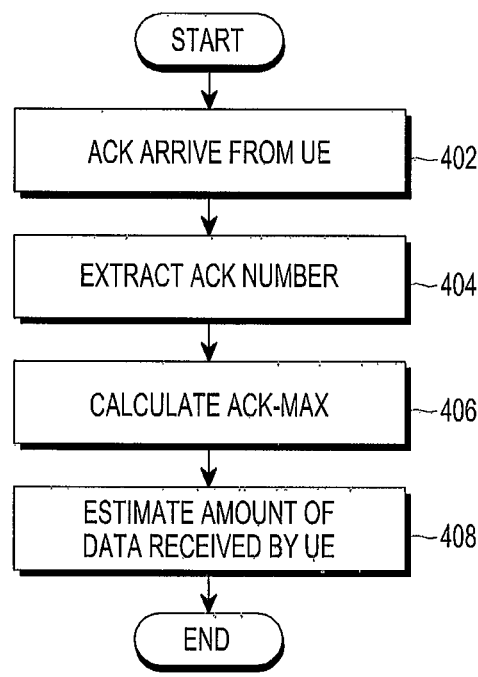
FIG. 4 is a flowchart illustrating operations for estimating an amount of data received at user equipment, according to an embodiment of the present disclosure.

FIG. 4 is a flowchart illustrating operations for estimating an amount of data received at UE, according to an embodiment of the present disclosure. Operations as illustrated may be performed on the TCP connection between a proxy server and UE, periodically or on a predetermined command or event. An exemplary embodiment triggered when an ACK is received from the UE will be described below.

Referring to FIG. 4, the proxy server receives an ACK from the UE in operation 402, and extracts an ACK number included in the ACK in operation 404. In operation 406, the proxy server makes a final determination on a maximum ACK number (ACK_Max) to be a greater one of the extracted ACK number (extract_ack_number) and a maximum received ACK number up to the present. (Ack_Max=Max{Ack_Max, extracted_ack_number}) This is because an ACK received from the UE may be received out of ACK number sequence rather than being in the sequence.

In operation 408, the proxy server estimates an amount of data received by the UE based on the maximum ACK number and an initial sequence number determined when the TCP connection is established. Specifically, the amount of data received by the UE (Estimated_Received_bytes_by_UE) is calculated by subtracting the initial sequence number (Starting_TCP_seq) from the maximum ACK number (Ack_Max).

$$\text{Estimated\_Received\_bytes\_by\_UE} = \text{Ack\_Max} - \text{Starting\_TCP\_seq}$$

Figure 5:
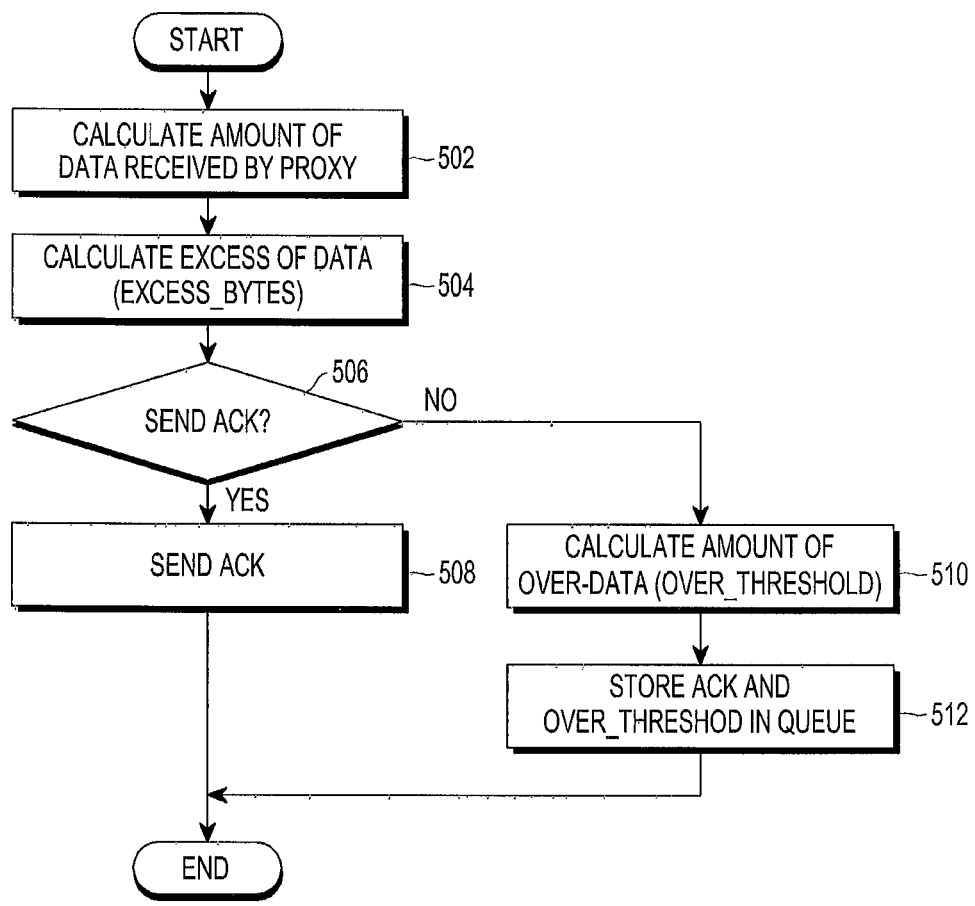
FIG. 5 is a flowchart illustrating operations for determining whether to send an Acknowledgement (ACK), according to an embodiment of the present disclosure.

FIG. 5 is a flowchart illustrating operations for determining whether to send a TCP ACK, according to an embodiment of the present disclosure. The operations illustrated may be triggered periodically or by a predetermined event. An exemplary embodiment triggered when an amount of data received by a UE is estimated will be described below.

Referring to FIG. 5, in operation 502, the proxy server calculates a size of data received from a content server, i.e., an amount of data received by a proxy server. Specifically, the amount of data received by the proxy server (Received_byte_by_proxy) is calculated by subtracting an initial sequence number (Starting_TCP_seq) set for the TCP connection between the proxy server and the content server from an ACK number (Ack_Num) obtained from the ACK received from the content server. The ACK number may be a maximum ACK number received from the content server.

$$\text{Received\_byte\_by\_proxy} = \text{Ack\_Num} - \text{Starting\_TCP\_seq}$$

In operation 504, the proxy server calculates an excess of data over that of the UE. For example, the excess of data (Excess_Byte) is calculated by subtracting the amount of data received by the UE from the amount of data received by the proxy server from the content server.

$$\text{Excess\_Byte} = \text{Received\_bytes\_by\_Proxy} - \text{Estimated\_received\_bytes\_by\_UE}$$

To prevent unnecessary data transmission between the proxy server and the content server, the excess of data needs to be maintained not to be excessively greater.

In operation 506, the excess of data is compared with a predetermined threshold. If the excess of data is less than the threshold, in operation 508, the proxy server sends an ACK on data received up- to the present directly to the content server. The threshold may be determined by taking into account e.g., at least one of data receive rate from the content server, data transmit rate to the UE, caching ability of the proxy server, and other parameters.

On the other hand, if the excess of data is not less than the threshold, in operation 512, the proxy server stores the ACK on data received up to the present. Alternatively, the proxy server calculates an amount of over-data (over_threshold) that represents an excessive amount of the data received up to the present over the threshold by subtracting the threshold from the excess of data, i.e., (over_threshold=Excess_bytes−Threshold), in operation 510, and stores the amount of over-data in the queue with the ACK, in operation 512.

The threshold to be compared with the excess of data may be fixed or variable by the system designer or operator. For example, the threshold may be determined based on at least one of a jitter (jitter_for_proxy_UE_connection) in the TCP connection between the proxy server and the UE, a jitter (jitter_for_proxy_server_connection) in the TCP connection between the proxy server and the content server, and a video data rate (video_data_rate). Equation (1) represents an example of determining the threshold.

$$\text{Threshold} = a * \text{jitter\_for\_proxy\_UE\_connection} + \\ b * \text{jitter\_for\_proxy\_server\_connection} + c * \text{video\_data\_rate} \quad (1)$$

where a, b, and c refer to predetermined weight coefficients.

The reason why the ACK is stored in the queue is that the UE has not downloaded a sufficient amount of data. Accordingly, once the UE downloads a sufficient amount of data, an ACK stored in the queue is sent to the content server. In an embodiment, the proxy server may use amounts of data received by the UE at a time when the ACK is stored in the queue and at the present time.

Figure 6:
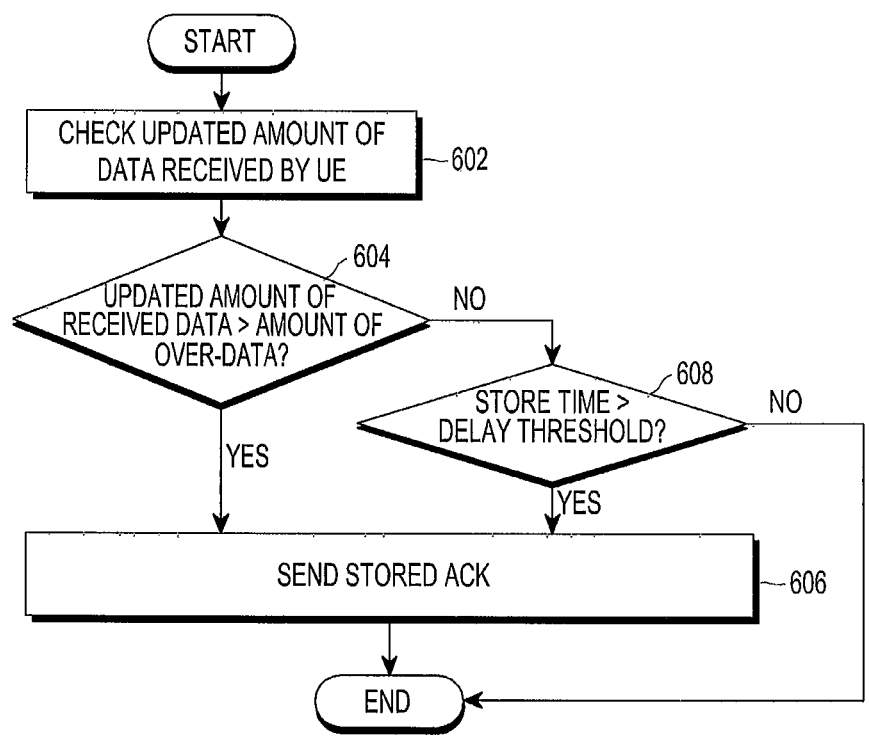
FIG. 6 is a flowchart illustrating operations for determining transmission of a stored ACK, according to an embodiment of the present disclosure.

FIG. 6 is a flowchart illustrating operations for determining transmission of a stored ACK, according to an embodiment of the present disclosure. The operations illustrated are directed to determining when to send an ACK stored in the queue, and triggered periodically or by a predetermined event. As an example, the operations may be triggered when an ACK is received from a UE and thus the amount of data received by the UE is updated.

Referring to FIG. 6, in operation 602, the proxy server determines an updated amount of received data which represents an amount of data additionally received from the UE after the ACK is stored in the queue. For example, the updated amount of received data (Updated_UE_download) is calculated by subtracting the amount of data (Estimated_Received_bytes_by_UE@queued_time) received by the UE at the time when the ACK is stored in the queue (queued_time) from the amount of data received by the UE as of the present (Estimated_Received_bytes_by_UE@now).

$$\text{Updated\_UE\_download} = \text{Estimated\_Received\_bytes\_by\_UE@now} - \text{Estimated\_Received\_bytes\_by\_UE@queued\_time}$$

In operation 604, the proxy server determines if the updated amount of received data (Updated_UE_download) is greater than an amount of over-data (over_threshold@queued_time) at the time when the ACK is stored in the queue. The amount of over-data is a value calculated in operation 510 and stored in the queue.

$$\text{over\_threshold@queued\_time} = \text{Received\_byte\_by\_Proxy@queued\_time} - \\ \text{Estimated\_Received\_bytes\_by\_UE@queued\_time} - \text{Threshold}$$

If the updated amount of received data is greater, in operation 606, the ACK stored in the queue is sent to the content server. On the other hand if the updated amount of received data is not greater, in-operation 608, the proxy server determines if a delay time (now-queued_time) that represents a time when the ACK is stored in the queue is greater than a predetermined delay threshold. If the delay time is greater, the ACK stored in the queue is sent to the content server. This is to prevent the content server from unnecessarily resending data that has been already sent from the content server. On the other hand, if the delay time is not greater, the ACK stays in the queue.

If no ACK is received from the proxy server, the content server does not send but hold data to the proxy server. However, even if the ACK is not received, the content server may resend data after a lapse of a timeout. Accordingly, the delay threshold may be determined to be the same as the retransmission timeout required by the TCP protocol, or determined by taking into account the retransmission timeout.

As such, if an amount of data (updated_UE_download) additionally downloaded by the UE after the ACK is stored in the queue becomes greater than an amount of over-data (over_threshold) at a time when the ACK is stored in the queue, the ACK stored in the queue is enabled to be sent to the content server.

Operations in accordance with embodiments of the present disclosure will now be described with reference to a specific example as follows:

The UE downloaded data of 1000 bytes through the proxy server, and the proxy server downloaded data of 1500 bytes from the content server. If a threshold is 300 bytes, it means that the proxy server wants to download up to 1300 bytes only. By the way, since the proxy server has downloaded 1500 bytes as of the present time, an ACK on the 1500 bytes is not sent to the content server but stored in the queue. Also, over-data of 200 bytes with respect to 1300 bytes is stored in the queue with the ACK.

After that, if an ACK indicating that the UE has received data of 1250 bytes arrives at the proxy server, Estimated_received_bytes_by_UE@NOW is in 1250 bytes, Estimated_received_bytes_by_UE@queued_time in 1000 bytes, and thus Updated_UE_download is in 250 bytes. Updated_UE_download is in excess of 200 bytes, which is Over_threshold@queued_time. Thus, the proxy server is allowed to store the ACK stored in the queue.

On the other hand, if time when the ACK on the 1500 bytes is stored in the queue exceeds the delay threshold although Updated_UE_download does not exceed Over_threshold@queued_time, the ACK is allowed to be sent to the content server.

Figure 7:
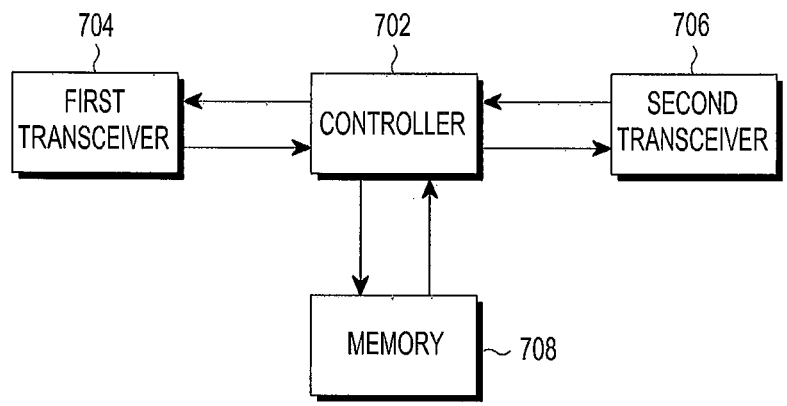
FIG. 7 is a block diagram of an internal structure of a proxy server, according to an embodiment of the present disclosure.

FIG. 7 is a block diagram of a structure of a proxy server, according to an embodiment of the present disclosure. In the structure of a proxy server, only some elements involved in the embodiments of the present disclosure is illustrated.

Referring to FIG. 7, the proxy server includes a first transceiver 704 for interfacing with UE, a second transceiver 706 for interfacing with a content server, a controller for controlling data flows between the first and second transceivers 704 and 706 and data transmission and/or reception operations in the first and second transceivers 704 and 706, and a memory 708 for storing program codes required for operations of the controller 702, parameters, and cached data.

The controller 702 estimates an amount of data received by the UE with reference to an ACK received from the UE through the first transceiver 704, calculates an amount of data received by the proxy server by monitoring data being received from the content server through the second transceiver 706, and generates an ACK on the received data. The controller 702 determines whether to send the ACK based on the embodiments as described earlier, and store the ACK in a queue within the controller 702 if the ACK is determined to be delayed. Otherwise, the ACK is sent to the content server through the second transceiver.

Alternatively, the controller 702 may determine whether to send an ACK first, rather than to generate an ACK immediately. If it is determined to delay the ACK, the controller 702 does not generate the ACK but wait until transmission of the ACK is allowed. In this case, at a point in time when it is determined to send the ACK based on the aforementioned embodiment, the controller 702 generates and immediately sends an ACK on data received up to the present.

As such, in the embodiments of the present disclosure, how much data UE has downloaded is estimated based on an ACK sent from the UE to the proxy server, and data reception from a content server is limited such that an amount of data downloaded by the proxy server is greater than an amount of data downloaded by the UE by a predetermined threshold. Furthermore, by preventing an ACK to be sent to the content server from being delayed, unnecessary data retransmission is avoided.

In accordance with the embodiments of the present disclosure, a proxy server may control an amount of data to be downloaded from a content server, and accordingly the proxy server may implement a JIT function. In addition, since the JIT function of the proxy server is made so long as it does not interfere with a JIT function of the UE while minimizing download amount, a waste of network load and unnecessary resources may be prevented.

Several embodiments have thus been described, but it will be understood that various modifications can be made without departing the scope of the present disclosure. Thus, it will be apparent to those ordinary skilled in the art that the disclosure is not limited to the embodiments described, but can encompass not only the appended claims but the equivalents.

The invention claimed is:

1. A method for controlling data flow by a proxy server connected between a User Equipment (UE) and a content server, the method comprising:
    determining, by the proxy server, a first amount of data received by the UE from the proxy server;
    determining, by the proxy server, a second amount of data received by the proxy server from the content server;
    delaying, by the proxy server, transmission of acknowledgement (ACK) on data received by the proxy server from the content server, if the second amount of data is greater than the first amount of data by a predetermined threshold;
    determining an updated amount of data received by the UE after the ACK is delayed; and
    sending the ACK to the contents server, if the updated amount of data is greater than an over amount of data generated based on subtracting the first amount of data and the threshold from the second amount of data.

2. The method of claim 1, wherein the delaying comprises calculating an excess of data as a difference between the second amount of data and the first amount of data; and
    delaying the ACK rather than sending to the content server, if the excess of data is not less than the threshold.

3. The method of claim 2, further comprising:
    calculating an amount of over-data as a difference between the excess of data and the threshold; and
    storing the amount of over-data in a queue together with the ACK.

4. The method of claim 1, further comprising:
    calculating an excess of data as a difference between the second amount of data and the first amount of data;
    calculating an amount of over-data as a difference between the excess of data and the threshold; and
    storing the amount of over-data in a queue together with the ACK.

5. The method of claim 1, further comprising: sending the ACK to the content server if ACK delay time exceeds a predetermined delay threshold.

6. The method of claim 5, wherein the delay threshold is set to be equal to a retransmission timeout set for connection between the proxy server and the content server.

7. An apparatus for controlling data flow in a proxy server connected between a User Equipment (UE) and a content server, the apparatus comprising:

a first transceiver for data transmission and reception with the UE;

a second transceiver for data transmission and reception with the content server; and a controller configured to:

determine a first amount of data received by the UE through the first transceiver;

determine a second amount of data received from the content server through the second transceiver;

delay transmission of acknowledgement (ACK) on data received from the content server, if the second amount of data is greater than the first amount of data by a predetermined threshold;

determine an updated amount of data received by the UE after the ACK is delayed; and send the ACK to the contents server, if the updated amount of data is greater than an over amount of data generated based on subtracting the first amount of data and the threshold from the second amount of data.

8. The apparatus of claim 7, wherein the controller is configured to calculate an excess of data as a difference between the second amount of data and the first amount of data; and delay the ACK rather than to send to the content server, if the excess of data is not less than the threshold.

9. The apparatus of claim 8, wherein the controller is configured to calculate an amount of over-data as a difference between the excess of data and the threshold; and store the amount of over-data in a queue together with the ACK.

10. The apparatus of claim 7, wherein the controller is configured to calculate an excess of data as a difference between the second amount of data and the first amount of data; calculate an amount of over-data as a difference between the excess of data and the threshold; and store the amount of over-data in a queue together with the ACK.

11. The apparatus of claim 7, wherein the controller is configured to send the ACK to the content server through the second transceiver if ACK delay time exceeds a predetermined delay threshold.

12. The apparatus of claim 11, wherein the delay threshold is set to be equal to a retransmission timeout set for connection between the proxy server and the content server.

13. A non-transitory computer readable storage medium comprising program code for controlling data flow in a proxy server connected between a User Equipment (UE) and a content server, the program code, when executed, causes a proxy server to:

determine a first amount of data received by the UE from the proxy server;

determine a second amount of data received by the proxy server from the content server;

delay transmission of acknowledgement (ACK) on data received from the content server, if the second amount of data is greater than the first amount of data by a predetermined threshold;

determine an updated amount of data received by the UE after the ACK is delayed; and send the ACK to the contents server, if the updated amount of data is greater than an over amount of data generated based on subtracting the first amount of data and the threshold from the second amount of data.

14. The computer readable storage medium of claim 13, wherein the program code, when executed, causes the proxy server to calculate an excess of data as a difference between the second amount of data and the first amount of data; and delay the ACK rather than to send to the content server, if the excess of data is not less than the threshold.

15. The computer readable storage medium of claim 14, wherein the program code, when executed, causes the proxy server to calculate an amount of over-data as a difference between the excess of data and the threshold; and store the amount of over-data in a queue together with the ACK.

16. The computer readable storage medium of claim 13, wherein the program code, when executed, causes the proxy server to send the ACK to the content server if ACK delay time exceeds a predetermined delay threshold.

17. The computer readable storage medium of claim 16, wherein the delay threshold is set to be equal to a retransmission timeout set for connection between the proxy server and the content server.

* * * * *